(12) United States Patent
McCaffrey

(10) Patent No.: US 10,577,963 B2
(45) Date of Patent: Mar. 3, 2020

(54) RETENTION CLIP FOR A BLADE OUTER AIR SEAL

(71) Applicant: UNITED TECHNOLOGIES CORPORATION, Farmington, CT (US)

(72) Inventor: Michael G. McCaffrey, Windsor, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 535 days.

(21) Appl. No.: 15/112,944

(22) PCT Filed: Jan. 20, 2015

(86) PCT No.: PCT/US2015/011963
§ 371 (c)(1),
(2) Date: Jul. 20, 2016

(87) PCT Pub. No.: WO2015/109292
PCT Pub. Date: Jul. 23, 2015

(65) Prior Publication Data
US 2016/0333715 A1    Nov. 17, 2016

Related U.S. Application Data

(60) Provisional application No. 61/929,166, filed on Jan. 20, 2014.

(51) Int. Cl.
*F01D 11/08*    (2006.01)
*F01D 25/24*    (2006.01)
(Continued)

(52) U.S. Cl.
CPC ............. *F01D 11/08* (2013.01); *F01D 5/02* (2013.01); *F01D 25/24* (2013.01); *F01D 25/246* (2013.01);
(Continued)

(58) Field of Classification Search
CPC .......... F01D 11/08; F01D 11/005; F01D 5/02; F01D 25/24; F01D 25/246; F02C 3/04;
(Continued)

(56) References Cited

U.S. PATENT DOCUMENTS 3,966,353 A    6/1976    Booher, Jr. et al.
4,650,395 A *  3/1987    Weidner ............. F01D 11/08
                                                 415/115

(Continued)

FOREIGN PATENT DOCUMENTS

EP    2093384 A2    8/2009
EP    2336497 A2    6/2011
EP    1707749 B1    2/2012

OTHER PUBLICATIONS

Supplementary European Search Report for European Patent Application No. 15737519.7 completed Dec. 16, 2016.

*Primary Examiner* — Mark A Laurenzi
*Assistant Examiner* — Loren C Edwards
(74) *Attorney, Agent, or Firm* — Carlson, Gaskey & Olds, P.C.

(57) ABSTRACT

One exemplary embodiment of this disclosure relates to a system having a static segment with a circumferentially extending slot. The system further includes a retention clip (Continued)

partially received in the slot, and partially contacting a circumferential end of the static segment.

11 Claims, 4 Drawing Sheets

(51) Int. Cl.
    *F01D 5/02*     (2006.01)
    *F02C 3/04*     (2006.01)
    *F04D 29/16*     (2006.01)
    *F04D 29/32*     (2006.01)
    *F04D 29/52*     (2006.01)

(52) U.S. Cl.
    CPC ............... *F02C 3/04* (2013.01); *F04D 29/164* (2013.01); *F04D 29/321* (2013.01); *F04D 29/526* (2013.01); *F05D 2220/32* (2013.01); *F05D 2240/11* (2013.01); *F05D 2240/35* (2013.01); *F05D 2260/30* (2013.01); *F05D 2300/6033* (2013.01); *Y02T 50/672* (2013.01)

(58) Field of Classification Search
    CPC ........ F02C 7/28; F04D 29/164; F04D 29/321; F04D 29/526; F05D 2240/11; F05D 2240/35; F05D 2260/30; F05D 2300/6033; F02F 11/00
    USPC .......................................................... 60/805
    See application file for complete search history.

(56) References Cited

U.S. PATENT DOCUMENTS

| | | |
|---|---|---|
| 4,759,687 A | 7/1988 | Miraucourt et al. |
| 4,838,031 A * | 6/1989 | Cramer .................. F23R 3/002 60/39.091 |
| 5,169,287 A * | 12/1992 | Proctor .................. F01D 5/182 415/115 |
| 5,423,659 A | 6/1995 | Thompson |
| 5,486,090 A | 1/1996 | Thompson |
| 5,538,393 A | 7/1996 | Thompson et al. |
| 6,142,731 A | 11/2000 | Dewis et al. |
| 6,393,331 B1 | 5/2002 | Chetta et al. |
| 7,597,533 B1 | 10/2009 | Liang |
| 7,704,039 B1 | 4/2010 | Liang |
| 8,206,087 B2 | 6/2012 | Campbell et al. |
| 8,303,247 B2 | 11/2012 | Schlichting et al. |
| 2009/0079139 A1* | 3/2009 | Schiavo .................. F01D 9/04 277/595 |
| 2009/0208322 A1 | 8/2009 | McCaffrey |
| 2011/0056055 A1 | 3/2011 | Gendraud et al. |
| 2011/0236203 A1* | 9/2011 | Arilla ....................... F01D 9/04 415/213.1 |
| 2011/0293410 A1 | 12/2011 | Marusko et al. |
| 2013/0004306 A1 | 1/2013 | Albers et al. |
| 2013/0108416 A1 | 5/2013 | Piggush et al. |
| 2013/0170963 A1 | 7/2013 | Mironets et al. |

* cited by examiner

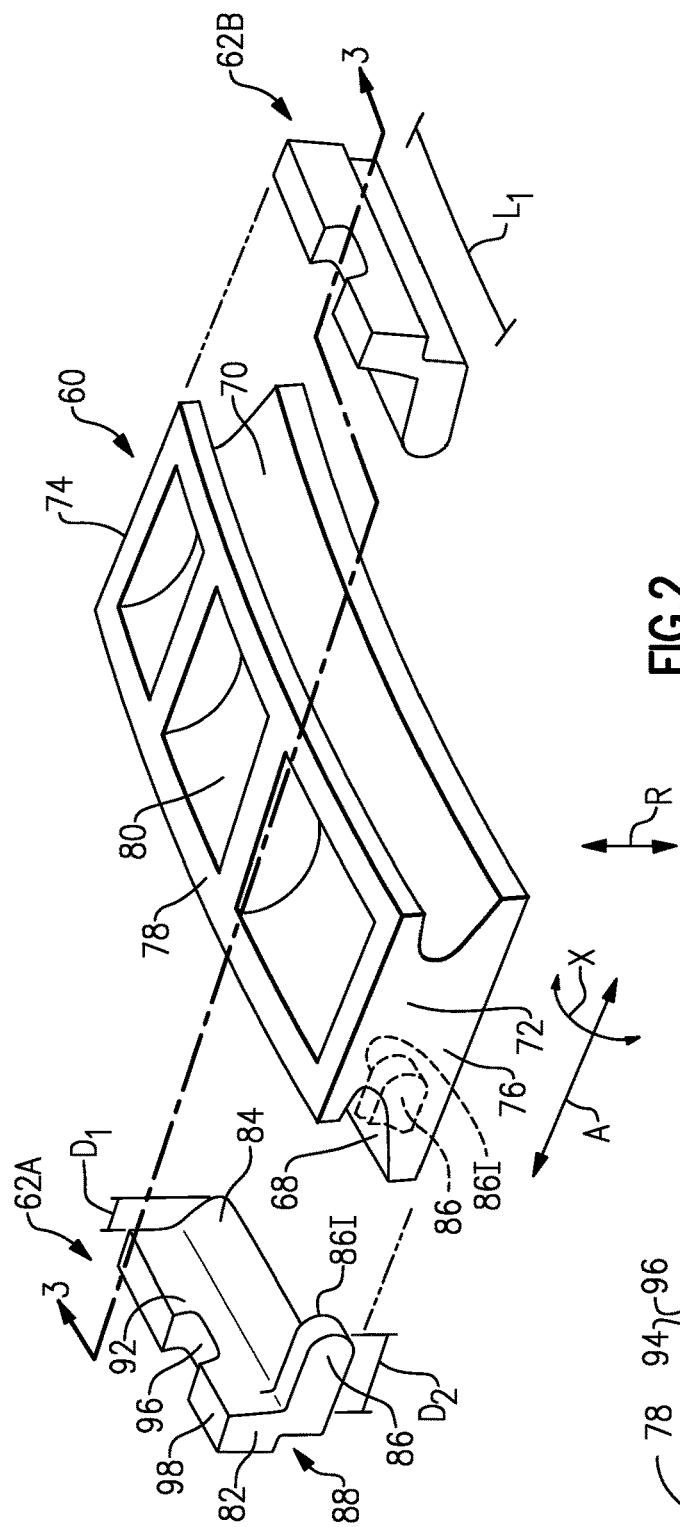
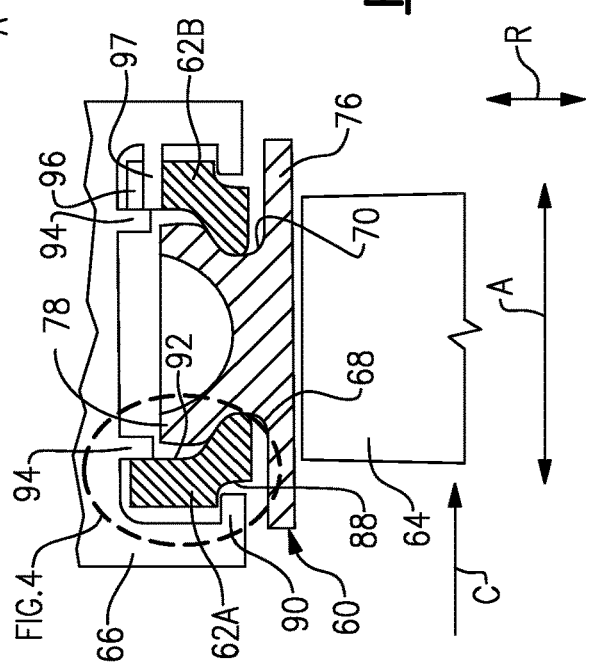
FIG.2
FIG.3

RETENTION CLIP FOR A BLADE OUTER AIR SEAL

BACKGROUND

Gas turbine engines typically include a compressor section, a combustor section, and a turbine section. The compressor and turbine sections include alternating rows of rotating blades and stationary vanes. The turbine blades rotate and extract energy from hot combustion gases that are communicated through the gas turbine engine.

An engine case may support one or more blade outer air seal (BOAS) segments, which are provided adjacent the tips of the rotating blades and establish an outer flow path boundary for the hot combustion gasses. BOAS segments are typically supported relative to the engine case by a plurality of attachment hooks. In one known example, the attachment hooks of the BOAS segments connect to corresponding attachment hooks of the engine case.

SUMMARY

One exemplary embodiment of this disclosure relates to a system having a static segment with a circumferentially extending slot. The system further includes a retention clip partially received in the slot, and partially contacting a circumferential end of the static segment.

In a further embodiment of any of the above, the system includes a support structure, and the retention clip includes a main body portion in contact with the support structure.

In a further embodiment of any of the above, the retention clip includes a first projection extending from the main body portion, the first projection received in the slot.

In a further embodiment of any of the above, the retention clip includes a second projection extending further from the main body portion than the first projection, the second projection abutting a circumferential end of the static segment.

In a further embodiment of any of the above, a groove is formed in a radially inner surface of the main body portion, and wherein the support structure includes an arm received in the groove.

In a further embodiment of any of the above, one of the groove and the arm includes a convex surface.

In a further embodiment of any of the above, the support structure includes a flange, and wherein a face of the main body portion abuts the flange.

In a further embodiment of any of the above, the main body portion includes a notch formed in a radially outer surface thereof, and wherein the support structure includes a tab received in the notch.

In a further embodiment of any of the above, the support structure provides a channel, and wherein the main body portion is sized to correspond to the size of the channel.

In a further embodiment of any of the above, the retention clip is made of a material selected from the group consisting of (1) a ceramic material, (2) a nickel-based alloy, and (3) a cobalt-based alloy.

In a further embodiment of any of the above, the static segment includes a fore slot and an aft slot, each of the fore slot and the aft slot extending in a circumferential direction.

In a further embodiment of any of the above, the system includes a first retention clip at least partially received in the fore slot, and an second retention clip at least partially received in the aft slot.

In a further embodiment of any of the above, the static segment is a blade outer air seal (BOAS) segment.

Another exemplary embodiment of this disclosure relates to a retention clip for supporting a blade outer air seal (BOAS segment). The retention clip includes a main body portion, a first projection extending from the main body portion for receipt in a slot of a blade outer air seal (BOAS segment), and a second projection extending from the main body portion for abutting an end of the BOAS segment.

In a further embodiment of any of the above, the first projection includes an arcuate face.

In a further embodiment of any of the above, an inner surface of the main body portion includes a groove formed therein, the groove running along the length of the retention clip.

In a further embodiment of any of the above, an outer surface of the main body portion includes a notch formed therein, the notch generally transverse to the length of the retention clip.

In a further embodiment of any of the above, a flange extends from an outer surface of the main body portion.

Another exemplary embodiment of this disclosure relates to a gas turbine engine. The engine includes a compressor section, a combustor section, and a turbine section. The engine further includes an engine case provided adjacent at least one of the compressor section and the turbine section, and a blade outer air seal (BOAS segment) having a circumferentially extending slot. The engine also includes a retention clip provided between the BOAS segment and the engine case, the retention clip partially received in the slot and partially contacting a circumferential end of the BOAS segment.

In a further embodiment of any of the above, the retention clip includes a first projection extending from the main body portion, the first projection received in the slot, and wherein the retention clip includes a second projection extending further from the main body portion than the first projection, the second projection abutting a circumferential end of the BOAS segment.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 2 is an exploded view, illustrating an example blade outer air seal (BOAS) segment and two retention clips.

FIG. 3 is a cross-sectional view taken along line 3-3 from FIG. 2, and illustrates a first example retention clip arrangement.

DETAILED DESCRIPTION

Figure 1:
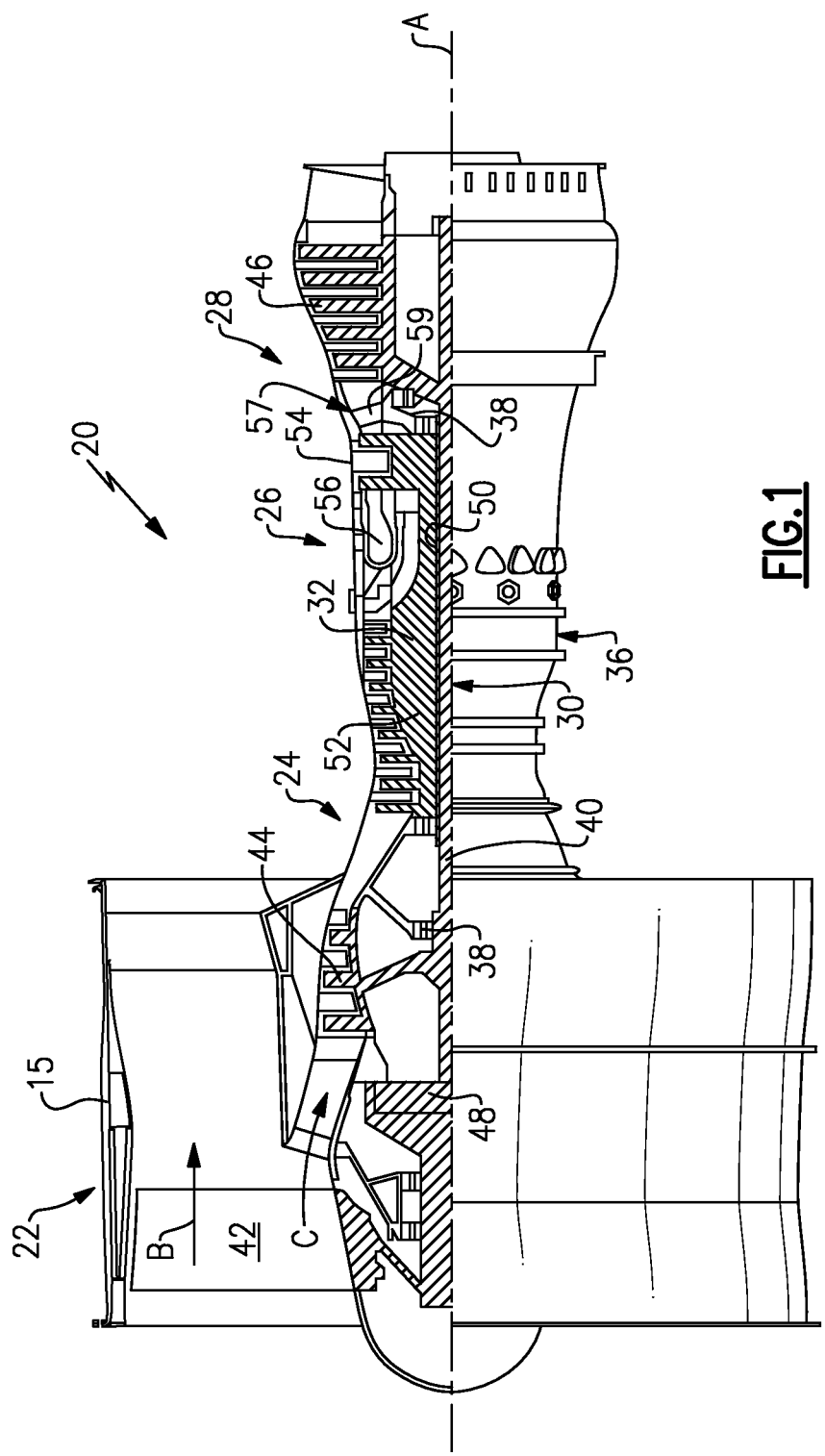
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

FIG. 2 illustrates a BOAS segment 60 and a pair of retention clips 62A, 62B on opposed axial sides (e.g., relative to the engine central longitudinal axis A) of the BOAS segment 60. The individual BOAS segments 60 may be referred to individually as a "BOAS segment" or simply a "BOAS." The BOAS segments 60 may find beneficial use in many industries including aerospace, industrial, electricity generation, naval propulsion, pumps for gas in oil transmission, aircraft propulsion, vehicle engines and stationary power plants. While reference is specifically made herein to a BOAS segment, this disclosure could be used relative to other static segments within an engine, such as combustor panels or other structures.

With continued reference to FIG. 2, the BOAS segment 60 is supported radially outside (e.g., relative to a radial direction R, normal to the engine central longitudinal axis A) an array of rotor blades 64 (FIG. 3) by way of the retention clips 62A, 62B and an engine case 66, in this example. In one example, the BOAS segments 60 may be arranged to form a full ring hoop assembly, which provides a sealing surface for the blades 64 to prevent leakage of the core airflow C over the blades 64.

The BOAS segment 60 in this example includes fore and aft slots 68, 70 extending in a circumferential direction X between circumferential ends 72, 74 of the BOAS segment 60. In this example, the fore and aft slots 68, 70 span the entire circumferential length of the BOAS segment 60. The fore and aft slots 68, 70 are generally arcuate, and face along the engine central longitudinal axis A. The fore and aft slots 68, 70 are provided generally between a radially inner flange 76 of the BOAS segment 60 and a radially outer flange 78 thereof. In one example, the BOAS segment 60 includes at least one trough 80 between the circumferential ends 72, 74 for receiving a cooling flow of fluid. The trough 80 may be part of an overall cooling scheme for cooling portions of the BOAS segment 60.

In one example, the BOAS segment 60 is made of a ceramic material. The BOAS segment 60 may be made of layered ceramic matrix composite (CMC) sheets or formed from a single monolithic block of ceramic. This disclosure extends to BOAS segments 60 made of other materials, however.

The details of the retention clips 62A, 62B will be primarily discussed relative to retention clip 62A. It should be understood that, in this non-limiting example, the retention clip 62B includes the same features as the retention clip 62A, and would be arranged relative to the BOAS segment 60 in a similar manner.

The retention clip 62A includes a main body portion 82 extending generally in the radial direction R. The retention clips 62A, 62B have a length $L_1$ in a circumferential direction. The length $L_1$ in this example is shorter than the circumferential length of the BOAS segment 60.

Figure 4:
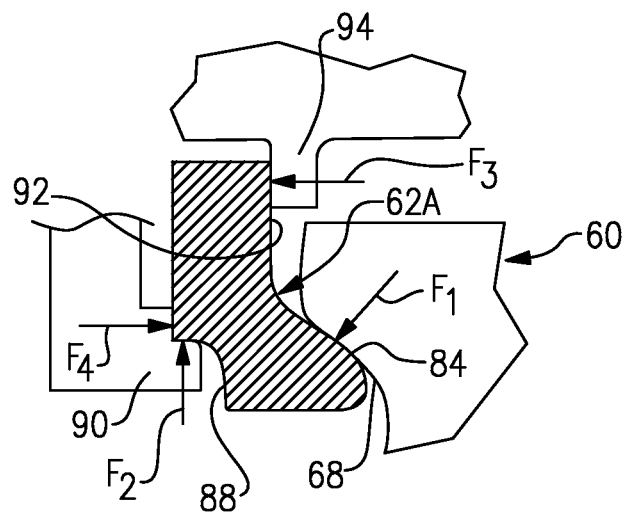
FIG. 4 is a close-up view of the encircled area labeled "FIG. 4" in FIG. 3.

To radially and axially support the BOAS segment 60, the retention clip 62A has first projection 84 projecting a first distance $D_1$ from the main body portion 82. The first projection 84 includes a generally arcuate surface, corresponding to the arcuate shape of the fore slot 68 of the BOAS segment 60. As illustrated in FIGS. 3-4, the first projection 84 extends into the fore slot 68. A similar projection of the retention clip 62B is received in the aft slot 70 in the same way as the retention clip 62A.

To circumferentially limit movement of the BOAS segment 60, the retention clip 62A includes a second projection 86 projecting a second distance $D_2$ from the main body portion 82 than the first projection 84. The second distance $D_2$ is larger than the first distance $D_1$. The second projection 86 includes an inner surface 86I for abutting the circumferential end 72 of the BOAS segment 60 (shown in phantom in FIG. 2).

In order to support the retention clip 62A relative to the engine case 66, in this example, the retention clip 62A includes a groove 88 in a radially inner surface of the main body portion 82. The groove 88 extends circumferentially along the entire length $L_1$ of the retention clip 62A. As shown in FIG. 3, a support arm 90 of the engine case 66 extends into the groove 88 to radially support the retention clip 62A.

For additional support, the main body portion 82 includes a front face 92 that abuts a radially extending flange 94 (FIG. 3) connected to the engine case 66 to limit axial movement of the retention clip 62A relative to the engine case 66. The main body portion 82 further includes, in this example, a notch 96 in a radially outer surface 98 thereof for cooperation with an axially extending tab 97 (illustrated relative to retention clip 62B in FIG. 3) of the engine case 66 (FIG. 3). While a notch 96 and tab 97 are shown, other structures that would provide anti-rotation come within the scope of this disclosure. In this example, the notch 96 extends in a direction generally transverse to the length $L_1$ of the retention clip 62A. The tab 97 prevents circumferential movement of the retention clip 62A relative to the engine case 66.

FIG. 4 is a close-up of the encircled area labeled "FIG. 4" in FIG. 3, and illustrates four loads $F_1$-$F_4$ that may be experienced by the retention clip 62A during engine operation. As illustrated in FIG. 4, there is a first load $F_1$ between the first projection 84 of the retention clip 62A and the fore slot 68. A second load $F_2$ is between the groove 88 and the arm 90 of the engine case 66. A third load $F_3$ is established between the flange 94 extending from the engine case in contacting the face 92 of the retention clip 62A. A fourth load $F_4$ is established between the forward face of clip 62A and the aft facing surface of arm 90. As the loads $F_1$-$F_4$ are applied, the retention clip 62A is retained in position relative to the engine case 66, and provides effective support for the BOAS segment 60.

Figure 5A:
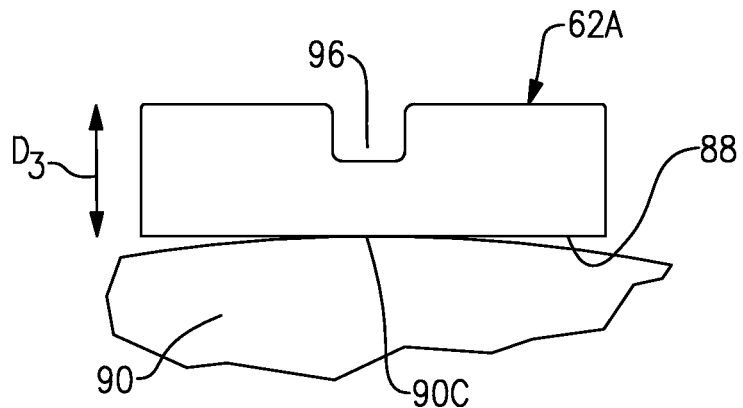
FIG. 5A illustrates a first example connection between the retention clip and an arm of the engine case.
Figure 5B:
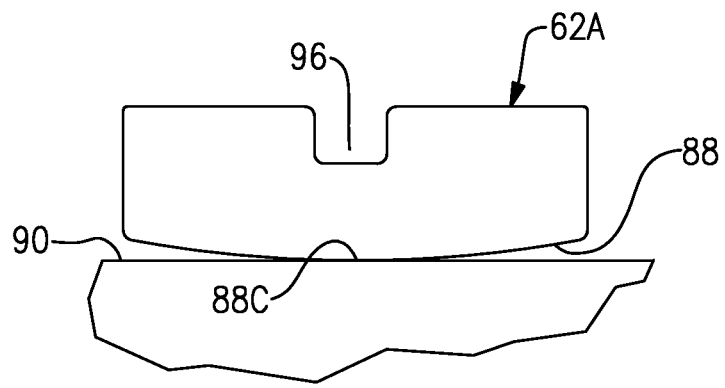
FIG. 5B illustrates a second example connection between the retention clip and an arm of the engine case.

As illustrated in FIGS. 5A-5B, one of the groove 88 and the arm 90 may include a convex surface. In FIG. 5A, a radially outer surface of the arm 90 includes a convex portion 90C for engagement with the groove 88 of the retention clip 62A. In FIG. 5B, the groove 88 is provided with a convex portion 88C for engagement with the radially outer surface of the arm 90. In either case, the convex surface allows the retention clip 62A to essentially rock relative to the arm 90 in the direction $D_3$ (FIG. 5A). This reduces concentrated point loads as the BOAS segment 60 expands and contracts relative to the engine case 66 during operation.

During operation of the engine, the BOAS segment 60, which may be made of ceramic, may reach temperatures that are relatively high for the engine case 66 (which itself may be made of a metallic material). In one particular example, the BOAS segment 60 is made from a low coefficient of thermal expansion (CTE) material, such as ceramic or CMC. In this example, the BOAS segment 60 experiences small changes in shape due to changes in temperature during operation. The engine case 66, on the other hand, may be made from a material with a relatively high CTE, such as iron-based or nickel-based alloys, and experience relatively large changes in shape relative to the BOAS segment 60, even though the relative temperature of the case 66 may be substantially lower than the BOAS segment 60. The use of the retention clips 62A, 62B, allows the changes in shape between the BOAS segment 60 and the engine case 66 to occur, while maintaining a substantially consistent contact force $F_3$. The retention clips 62A, 62B further provide a simplified design, and improve the structural reliability of the BOAS segment 60.

In addition to supporting the BOAS segments 60 relative to the engine case 66, the retention clips 62A, 62B provide thermal insulation between the BOAS segments 60 and the engine case 66. In one example, the retention clips 62A, 62B, may be made of a ceramic material. In other examples, the retention clips 62A, 62B are made of another high temperature resistant material, such as a nickel-based (Ni-based) or cobalt-based (Co-based) alloy. Regardless of the material selected for the retention clips 62A, 62B, the retention clips 62A, 62B dissipate heat from the BOAS segment 60 and protect the engine case 66.

While one particular retention clip arrangement is illustrated across FIGS. 2-5B, additional arrangements come within the scope of this disclosure. For instance, in FIG. 6A, the retention clips 100A-100B have a main body portion 102 that is sized to be received in a channel 104 defined between the arms 90 of the engine case 66. The retention clips 100A-100B may then include projections 106 for receipt in the fore and aft slots 68, 70 of the BOAS segment, as substantially described above.

Figure 6A:
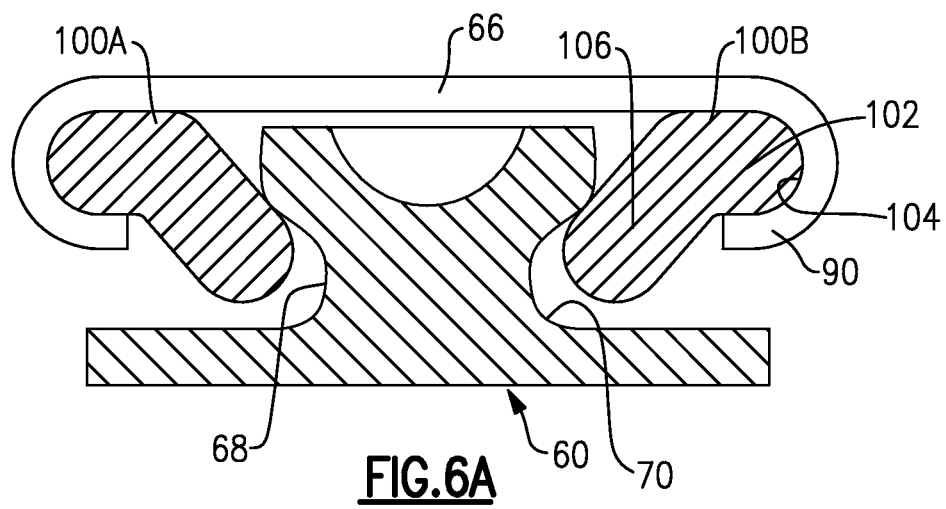
FIG. 6A illustrates a second example retention clip arrangement.
Figure 6B:
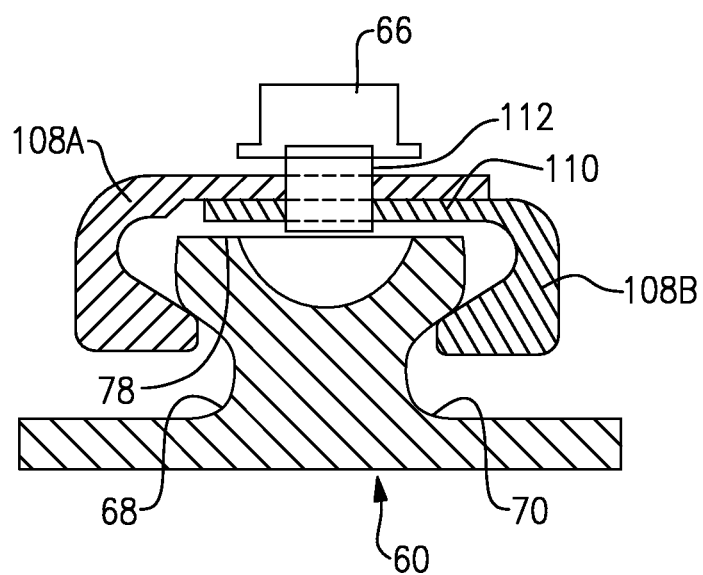
FIG. 6B illustrates a third example retention clip arrangement.

With reference to FIG. 6B, the retention clips 108A-108B may be provided with flanges 110 that extend radially outside of the radially outer flange 78 of the BOAS segment 60. The flanges 110 are received in a loop 112, which is connected to the engine case 66. While FIG. 6A-6B illustrates two alternate examples, it should be understood that additional arrangements could come within the scope of this disclosure.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret the term. The term "clip" as used herein is not intended to imply any structure associated with the act of "clipping" two elements together, such as in a clasp. Instead, the term "clip" is used herein to refer to a structure (e.g., the retention clips 62A, 62B) for holding and/or connecting structures together (e.g., the BOAS segment 60 and the engine case 66).

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A system, comprising:
a static segment including a fore slot and an aft slot, each of the fore slot and the aft slot extending in a circumferential direction relative to an engine central longitudinal axis;
a first retention clip at least partially received in the fore slot;
a second retention clip at least partially received in the aft slot, wherein the first and second retention clips abut opposite circumferential ends of the static segment, and wherein each of the first and second retention clips exhibits an overall length less than a circumferential length of the static segment;
a support structure, wherein the first and second retention clips each include a main body portion in contact with the support structure; and
wherein a groove is formed in a radially inner-most surface of each of the main body portions, and wherein the support structure includes arms received in a corresponding one of the grooves.

2. The system as recited in claim 1, wherein the first and second retention clips each include a first projection extending from a respective main body portion and received in a respective one of the fore and aft slots.

3. The system as recited in claim 2, wherein the first and second retention clips each include a second projection extending further from the main body portion than the first projection and abutting a respective circumferential end of the static segment.

4. The system as recited in claim 1, wherein one of the grooves and the arms includes a convex surface.

5. The system as recited in claim 1, wherein the support structure includes a flange, and wherein a face of each of the main body portions abuts the flange.

6. The system as recited in claim 1, wherein the main body portions each include a notch formed in a radially outer surface thereof, and wherein the support structure includes a tab received in the notch.

7. The system as recited in claim 1, wherein the support structure provides channels, and wherein the main body portions are sized to correspond to the size of the channels.

8. The system as recited in claim 1, wherein the first and second retention clips are made of a material selected from the group consisting of (1) a ceramic material, (2) a nickel-based alloy, and (3) a cobalt-based alloy.

9. The system as recited in claim 1, wherein the static segment is a blade outer air seal (BOAS) segment.

10. The system as recited in claim 1, wherein:
the static segment includes a radially-facing trough between the fore slot and the aft slot, and
the first and second retention clips are not arranged in the trough.

11. A gas turbine engine, comprising:
a compressor section, a combustor section, and a turbine section;
an engine case provided adjacent at least one of the compressor section and the turbine section;
a blade outer air seal (BOAS segment) having a circumferentially extending slot facing in one of a fore direction and an aft direction relative to a central longitudinal axis of the gas turbine engine; and
a retention clip provided between the BOAS segment and the engine case, the retention clip partially received in the slot and partially contacting a circumferential end of the BOAS segment,
wherein the retention clip includes a first projection extending from a main body portion, the first projection received in the slot, and wherein the retention clip includes a second projection extending further from the main body portion than the first projection, the second projection abutting the circumferential end of the BOAS segment, and wherein an overall length of the retention clip is less than a circumferential length of the BOAS segment.

* * * * *